Oct. 16, 1951           J. C. WEBSTER           2,571,979
ACOUSTIC MEASURING APPARATUS
Filed April 19, 1946
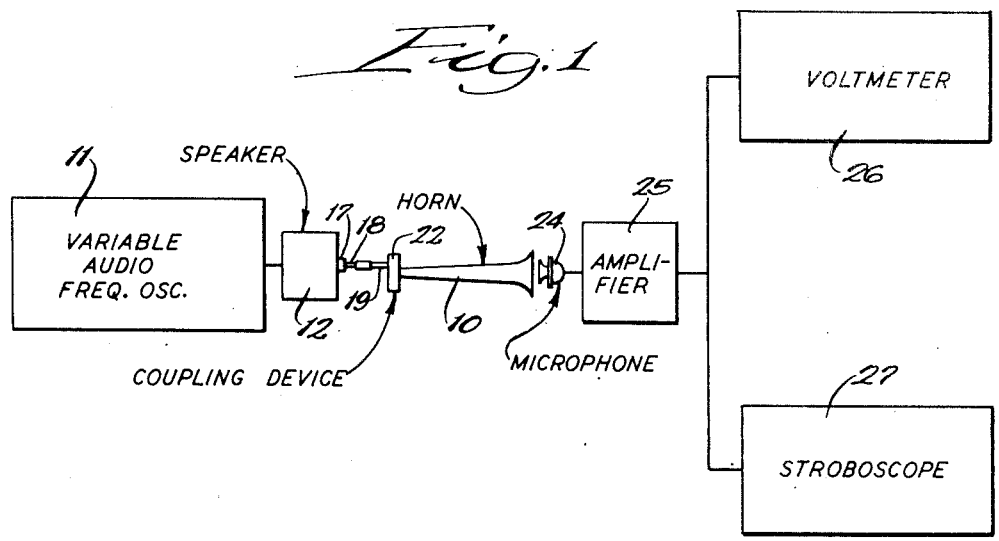
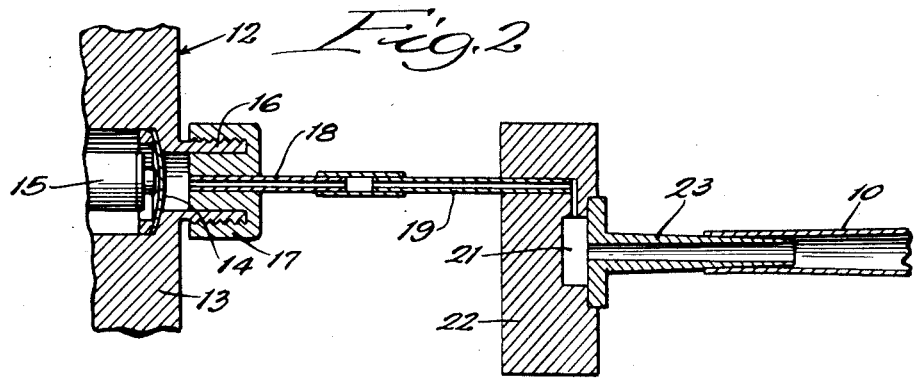
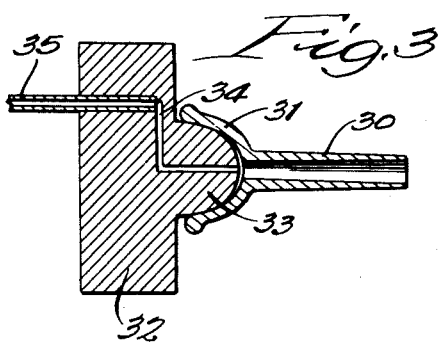

Patented Oct. 16, 1951

2,571,979

UNITED STATES PATENT OFFICE 2,571,979

ACOUSTIC MEASURING APPARATUS

John C. Webster, Elkhart, Ind., assignor to C. G. Conn, Ltd., Elkhart, Ind., a corporation of Indiana Application April 19, 1946, Serial No. 663,423

5 Claims. (Cl. 181—.5)

This invention relates to acoustic measuring apparatus and more particularly to the testing of tubes such as wind musical instrument bodies to determine the natural resonant points thereof.

For many years it has been customary to test wind musical instruments by having them blown by players. Since a player can vary the intonation of an instrument by as much as a semitone, it is necessary to take a large number of tests with different players to average out the human variables so that a fair indication of the resonant pitches of the instrument itself can be obtained.

It is one of the objects of the present invention to provide an acoustic measuring apparatus for determining the resonant frequency points of tubes such as wind musical instruments by purely mechanical means.

Another object is to provide an acoustic measuring apparatus in which a vibratile diaphragm furnishing a source of acoustic vibrations is acoustically decoupled from a tube to be tested. In a preferred construction this decoupling is effected by means of a variable acoustic resistance which can be so adjusted as to minimize attenuation while maintaining decoupling.

Still another object is to provide an acoustic measuring apparatus in which the tube to be tested functions as a closed end tube driven from its closed end.

A further object is to provide an acoustic measuring apparatus in which the tube is connected to the driving system through a connector providing a minimum diameter bore at the end of the tube to produce a pressure antinode in the connector at the minimum diameter. This arrangement accurately simulates the vibration conditions existing during normal playing of the instrument.

A still further object is to provide an acoustic measuring apparatus in which the amplitude and frequency of vibrations existing in the tube can be accurately measured to determine resonance points.

The above and other objects and advantages of the invention will be more readily apparent from the following description when read in connection with the accompanying drawing, in which—

Figure 1 is a diagrammatic view of a complete apparatus embodying the invention;

Figure 2 is an enlarged sectional view showing the diaphragm and the coupling parts; and Figure 3 is a partial section of an alternative connector.

While the invention can be used effectively to determine the resonance points of substantially any type of tube, it is particularly adapted for the testing of wind musical instruments and is illustrated and described herein in connection with the testing of a tapered horn tube as shown at 10 which may be a trumpet body or the like. Tubes of this type as used in instruments operate normally as closed end tubes and due to their taper, alter the frequencies of the odd modes of vibration so that they appear to be or simulate both odd and even modes. Thus in normal use of a trumpet, for example, an antinode exists at the point of maximum constriction in the mouthpiece and a node at the open end of the trumpet tube. As will appear more fully as the description proceeds, the present invention produces the same conditions in the tube so that testing of the tube in accordance with the invention will establish its resonant frequency under conditions accurately simulating those existing in normal playing of the completed instrument.

As shown the apparatus of the invention comprises a variable frequency audio oscillator indicated generally at 11, which may be any desired type of electrical oscillating device for producing electrical oscillations at audio frequencies. The oscillator is connected to a speaker indicated generally at 12 which includes a hollow housing 13 having a vibratile diaphragm 14 mounted therein which is driven by a coil 15 energized by the oscillator at variable audio frequencies. The housing 13 is formed with an outwardly extending tubular flange 16 at one side of the diaphragm to which a threaded cup member 17 may be connected. The cup member 17 carries a length of capillary tubing 18 which preferably has an internal diameter on the order of .04", although tubing sections of larger or smaller diameters could be employed by using longer or shorter lengths of tubing as required. A similar length 19 of similar tubing fits telescopically over the tubing piece 18 so that the effective length of capillary tubing can be adjusted. In use the capillary tubing provides a high acoustic resistance to decouple the diaphragm from the tube to be tested so that interaction between the diaphragm and the tube will be eliminated. At the same time capillary tubing serves to attenuate the vibrations and in testing operations is preferably adjusted to the shortest possible length which will maintain effective decoupling to minimize attenuation.

The tube 19 communicates with a small cavity 21 in a coupling block 22. One side of the cavity is closed by a connector 23 which in the case of mouthpiece type instruments is preferably a conventional mouthpiece cut-off as shown in the point of maximum restriction in the mouthpiece bore and having a disc attached to it for connection with the block 22. The minimum diameter in the mouthpiece is normally about .145" and in all cases the diameter of the tubes 18 and 19 must be small relative to this minimum diameter. The horn body to be tested may fit over the mouthpiece tube in the usual manner, as shown in Figure 2.

The vibrations existing in the horn body may be measured as to both amplitude and frequency by a measuring system as shown in Figure 1 including a microphone 24 mounted adjacent the open end of the horn body. The microphone will respond to the waves set up in the horn body and may be connected through an amplifier 25 with a voltmeter 26 and a frequency measuring device 27 which may conveniently be a stroboscope such as that more particularly described and claimed in the patent to Young and Loomis No. 2,286,030.

In testing an instrument body the body tube may be connected through a connector such as the mouthpiece 23 to the coupling block 22, and the diaphragm 14 may be driven at varying audio frequencies throughout the desired test range. When the driving frequency is such as to produce resonance in the horn body the amplitude of the vibrations as picked up by the microphone 24 will be maximum and will produce a maximum reading on the voltmeter 26. The frequency can be accurately determined by the stroboscope 27, this being preferred to an indication of the frequency of oscillation of the oscillator 11 due to the difficulty of accurately calibrating the oscillator. In testing a complete horn or other wind instrument the resonant frequency at the several valve settings may accurately be determined throughout the full range of the instrument. It will be understood that for different types of instrument tubes different connectors may be employed to produce vibration conditions similar to those occuring in actual playing of the instrument. The capillary tubing 18 and 19 may also be adjusted to minimize attenuation while maintaining the tube acoustically isolated from the diaphragm.

In testing of cup mouthpiece type instruments as illustrated, it has been found that a pressure antinode exists at the end of the connector 23 which opens into the cavity 21 and a pressure node exists at the open end of the tube 19. When different types of tubes are to be tested, for example, reed type instruments, other connectors may be employed which will produce a pressure antinode at the same point as antinodes occur in normal playing of the instrument with a full conventional mouthpiece.

For testing with a full cup mouthpiece a connector block as shown in Figure 3 may be used. In this figure a conventional mouthpiece is indicated at 30 having the usual cup 31 and adapted for connection to a horn. The connector comprises a block 32 formed with a projection 33 of a size and shape to fit into the cup so that its outer end lies close to the bottom of the cup. The block is formed with a small passage 34 terminating at the end of the projection 33 and communicating with a capillary tube 35. This construction operates in the same way as that of Figure 2 except that it permits testing of a complete horn with a conventional mouthpiece attached.

While two embodiments of the invention have been shown and described herein in detail, it will be understood that they are illustrative only and are not to be taken as a definition of the scope of the invention, reference being had to the appended claims for this purpose.

What is claimed is:

1. Acoustic measuring apparatus comprising a virbratile diaphragm, means for driving the diaphragm at variable acoustic frequencies, means defining a closed space adjacent one side of the diaphragm, a hollow coupling block having a connector thereon formed for airtight connection to one end of a tube whose resonant frequencies are to be determined, and a piece of tubing of small diameter relative to its length connecting the space adjacent the diaphragm to the hollow coupling block to provide a high acoustic resistance.

2. Acoustic measuring apparatus comprising a vibratile diaphragm, means for driving the diaphragm at variable acoustic frequencies, means defining a closed space adjacent one side of the diaphragm, a hollow coupling block having a connector thereon formed for airtight connection to one end of a tube whose resonant frequencies are to be determined, and a pair of telescopically interfitting pieces of capillary tubing connecting the space adjacent the diaphragm to the hollow coupling block to provide an adjustable acoustic resistance.

3. Acoustic measuring apparatus comprising a vibratile diaphragm, means for driving the diaphragm at variable acoustic frequencies, means defining a closed space adjacent one side of the diaphragm, a hollow coupling block having a connector thereon formed for airtight connection to one end of a tube whose resonant frequencies are to be determined, a piece of capillary tubing connecting the space adjacent the diaphragm to the hollow coupling block, means spaced from the coupling block to lie adjacent the other end of a tube connected to the coupling block and responsive to vibrations therein, and means connected to the last named means to measure the amplitude and frequency of the vibrations.

4. Acoustic measuring apparatus comprising a vibratile diaphragm, a housing inclosing the diaphragm on at least one side, means for driving the diaphragm at variable frequencies, a coupling block having a cavity therein open at one face of the block, a connector fitting into the open side of the cavity having a tapered bore therethrough of minimum diameter at the end adjacent the cavity, and a length of capillary tubing connecting the housing to the cavity in the coupling block.

5. Acoustic measuring apparatus comprising a vibratile diaphragm, a housing inclosing the diaphragm on at least one side, means for driving the diaphragm at variable frequencies, a coupling block having a cavity therein open at one face of the block, a connector fitting into the open side of the cavity having a tapered bore therethrough of minimum diameter at the end adjacent the cavity, the connector fitting being formed for connection to one end of a tube whose resonant frequencies are to be determined, and a pair of telescopically interfitting pieces of capillary tubing connecting the housing to the cavity in the coupling block.

JOHN C. WEBSTER.

REFERENCES CITED

The following references are of record in the file of this patent:

UNITED STATES PATENTS

| Number | Name | Date |
|---|---|---|
| 1,609,398 | Brigham | Dec. 7, 1926 |
| 1,715,831 | Hahnemann | June 4, 1929 |
| 1,936,796 | Legg | Nov. 28, 1933 |
| 2,055,713 | Alder | Sept. 29, 1936 |
| 2,153,800 | Holmes | Apr. 11, 1939 |
| 2,184,727 | Willians et al. | Dec. 26, 1939 |
| 2,278,668 | Piety | Apr. 7, 1942 |
| 2,280,226 | Firestone | Apr. 21, 1942 |
| 2,356,478 | Stryker | Aug. 22, 1944 |
| 2,390,847 | Olson | Dec. 11, 1945 |
| 2,394,613 | Houlgate et al. | Feb. 12, 1946 |